United States Patent [19]
Potter

[11] 3,867,777
[45] Feb. 25, 1975

[54] IDENTIFICATION TAG FOR ANIMALS AND/OR AN APPLICATOR FOR IDENTIFICATION TAGS

[76] Inventor: Douglas John Potter, Kelso No. 5 R.D. Gore, Southland, New Zealand

[22] Filed: Sept. 26, 1973

[21] Appl. No.: 400,913

[52] U.S. Cl. .................................................. 40/301
[51] Int. Cl. ............................................. G09f 3/04
[58] Field of Search ........................ 40/300, 301, 22

[56] References Cited
UNITED STATES PATENTS
3,512,289  5/1970  Hayes ................................. 40/301
3,552,051  1/1971  Ritchey ............................... 40/301

Primary Examiner—J. H. Wolff
Attorney, Agent, or Firm—Hubbard, Thurman, Turner & Tucker

[57] ABSTRACT

An identification tag comprising a holding head, an indicia bearing panel and a thickened neck portion connecting said head to said indicia bearing panel, of which the following is a specification.

4 Claims, 4 Drawing Figures

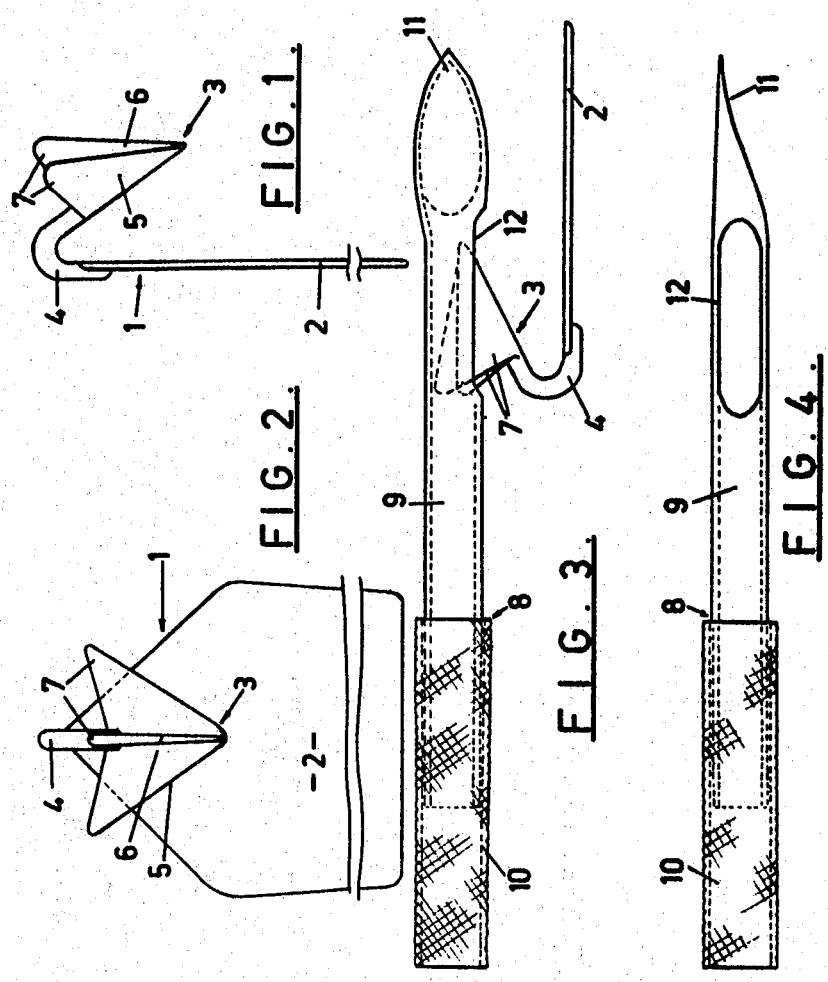

IDENTIFICATION TAG FOR ANIMALS AND/OR AN APPLICATOR FOR IDENTIFICATION TAGS

This invention relates to improved identification tags for animals and/or applicators for identification tags.

It is important to ensure identification tags remain in place once they have been attached to an animal. A number of identification tags are available, but the methods by which such tags are applied to animals have caused difficulties for operators particularly where the operator is required to combine a series of steps in conditions which are likely to be far from ideal.

The present invention is concerned with an identification tag having such a construction that it will overcome some of the difficulties currently experienced or which will at least provide a useful choice.

The present invention is further concerned with an applicator having such a construction that it will enable identification tags to be inserted in a manner more simple than currently possible.

Accordingly, in one aspect the invention may broadly be said to consist in an identification tag comprising a holding head, an indicia bearing panel and a thickened neck portion connecting said head to said indicia bearing panel.

Preferably the holding head has at least two shoulders extending away from the thickened neck portion and by way of example, these shoulders can be incorporated on an arrow head arrangement.

There are advantages where more than two abutment heads are included and in a preferred arrangement using the arrow head configuration, three wings will be provided, two in one plane and one extending normally therefrom centrally from the undersurface.

Other arrangements for providing a holding head could be used, but it is important to ensure the head may be collapsed so that the various wings or flaps making up the head can be folded together and held in this position ready for application.

Preferably the thickened neck portion is arranged to extend at an angle from the indicia bearing panel and to be generally in line with a main longitudinal axis of the holding head.

The thickened neck portion may be of any suitable cross-sectional shape and by way of example, may be cordlike having a round or substantially round section or may be elongated but should not assume a dimension greater than the width of the wings of the holding head when in the folded position ready for insertion into an applicator to be described below.

In a further aspect the invention may broadly be said to consist in an applicator for an identification tag having a holding head including abutment shoulders which may be folded together, said applicator incorporating a piercing member arranged to form a slit in the portion of the animal to which the identification tag is to be applied and a holding means arranged to hold the head of the identification tag in the folded position with the abutment shoulders substantially together to present the folded head substantially normally to the slit.

In a yet further aspect the invention may broadly be said to consist in an applicator for an identification tag having a flat head including abutment shoulders separated from an indicia bearing panel by a necked portion said applicator comprising a piercing member arranged to form a substantially C-shaped slit in the member for example an ear being pierced, said piercing member having a hollow interior at the rear of the cutting edge arranged to receive and hold the head of the identification tag in the folded position so that in use the head leading towards the abutment shoulders will be presented substantially normally to the slit and a handle means to grip the applicator and force the piercing member with the tag attached through the ear.

The invention may also broadly be said to consist in the parts, elements and features referred to or indicated in the specification of this application, individually or collectively, and any or all combinations of any two or more of said parts, elements or features, and where specific integers are mentioned herein which have known equivalents are deemed to be incorporated herein as if individually set forth.

The invention consists in the foregoing, and also envisages constructions of which the following gives examples only.

One preferred form of the invention will now be described with reference to the accompanying drawings in which:

FIG. 1 is a side view of an ear tag according to the present invention

FIG. 2 is a front view of FIG. 1

FIG. 3 is a side view of an applicator and

FIG. 4 is an underneath view of the applicator shown in FIG. 3.

The ear tag 1 has an indicia bearing panel 2 and a holding head 3 supported by a necked portion 4. The tag is preferably formed from a suitable resilient plastics or rubber compound and would ordinarily be moulded as an integral tag using acceptable and known processes. The indicia bearing panel 2 can be of any desired shape and the criteria to be satisfied should be a size sufficient to carry a numeral which can be readily visible. The holding head in the preferred embodiment illustrated has a substantially arrow shaped head 5 with an upstanding or vertical central wing 6 extending from the upper surface thereof to provide additional holding means to ensure the tag is kept in place. There are thus three abutment shoulders 7 formed on such tag. However, the tag according to the present invention could have any other arrangement of head consistent with providing abutment surfaces to ensure the tag is held in place and an arrangement whereby the abutment surfaces may be folded together ready for insertion through a slit, for example in an animal's ear. One obvious modification could be the removal of the wing 6.

The arrow head 5 may have a slight curvature or it may be straight across as illustrated in FIG. 2.

An applicator for the tag is illustrated in FIGS. 3 and 4. The applicator 8 has an ear piercing member 9 and a handle 10 which may be gripped by an operator. The applicator is preferably formed from a non-corrosive metal tube having the end 11 cut away to provide a piercing and cutting edge which will in use form a substantially C-shaped slit in the ear or other part of the animal to be pierced. At a distance in from the rear cutaway front is a closed slot 12. This slot 12 is located on an axis which is 90° to the axis on which the end 11 is located. The slot has a sufficient width and depth to accommodate the tag with the arrow-head top 5 folded towards the central wing 6 so that the abutment shoulders 7 are substantially together. The arrangement of the slot 12 and the resilience in the material from which the head 3 is made ensures the tag is firmly held in the slot ready for application to an animal.

The applicator 8 is loaded by an operator holding the tool handle 10 in one hand with his other hand holding the folded head 3 of the tag pushes it through the slot 12 and towards the piercing end 11 of the tool. The operator then by holding an ear of the animal with his other hand quickly pushes the piercing end 11 through the ear to form a substantially C-shaped slit, presenting the folded head 3 generally in line with the slit. On movement of the piercing member 9 of the tool through the C-shaped slit, this carries with it the folded head 3 through the slitted ear, without any undue extension of the slit. During this movement of the tool by the operator, the front side of the ear engages the underside of the folded head 3 to slide head 3 along slot 12 until shoulders 7 reach the back end of slot 12. At this point about two thirds of the length of head 3 has passed through the slit in the animal's ear. Further movement of the applicator tool 8 through the ear causes head 3 to abut the end of slot 12 and rotate, thus acting to force the folded head to eject it from the slot 12 of the member 9. Final withdrawal of the piercing member 9, now allows the folded head 3 to open out under the resilient qualities of the material from which the tag-head is made. The abutment shoulders 7 of the opened head cover an area at the back of the animal's ear greater than the length of the slit now distended due to the cross-section of the necked portion 4 of the tag. The opened head thus acts as a stop against any withdrawal of the tag from the ear.

What is claimed is:

1. A resilient one piece animal identification ear tag comprising a holding head, an indicia bearing panel and a thickened angular neck portion connecting said head to said indicia bearing panel and defining an acute angle therebetween, the holding head consisting of three abutment shoulders extending away from the thickened neck portion, each of said shoulders including a triangular wing of thin cross section, the first and second wings being in one plane and the third wing extending normal to said plane and centrally disposed between said first and second wings, said first and second wings being characterized by resiliently folding substantially parallel to the third wing for insertion of said holding head through a narrow slit in an animal's ear.

2. The combination comprising an animal identification ear tag applicator comprising an elongated member having a pointed end substantially C-shaped for forming a slit in an ear of an animal to which an ear tag is to be applied, said member having a hollow interior at said pointed end and a closed slot along the longitudinal axis of said member near said pointed end; and a resilient one piece animal identification ear tag comprising a holding head, an indicia bearing panel and a thickened angular neck portion connecting said head to said indicia bearing panel and defining an acute angle therebetween, the holding head consisting of three abutment shoulders extending away from the thickened neck portion, each of said shoulders including a triangular wing of thin cross section, the first and second wings being in one plane and the third wing extending normal to said plane and centrally disposed between said first and second wings, said first and second wings being characterized by resiliently folding substantially parallel to the third wing for insertion in said closed slot so that the three abutment shoulders of the head are juxtaposable in parallel in the closed slot of the elongated member;

said slot being substantially near said pointed end of said applicator so that when the front of the ear of the animal is slit by the end of the pointed member the holding head retained within said slot of the applicator is carried substantially through the slit whereupon the holding head is angled to abut the slit and the abutment shoulders are adapted to engage the rear end of the closed slot to eject the holding head from the closed slot, thereby allowing the resilient folded first and second wings to open and assume an extended position with the head abutment shoulders engaging the rear side of the animal's ear.

3. A resilient one piece identification tag for insertion using a piercing tool through a slit in an animal's ear for attachment to said ear comprising an indicia bearing panel; an angled neck portion attached to one end of said panel; and at least three wings each extending in a different plane normal to the longitudinal axis of said neck portion, said wings being connected together along a line extending along the longitudinal axis of said angled neck portion, said wings being characterized by flexibly and resiliently folding together in substantially the same plane and along said connecting line for holding by said piercing tool and insertion in said ear slit, said connecting line defining an acute angle with said panel to abut said ear slit during insertion to release said folded wings from said piercing tool after insertion through said slit and allow the wings to assume an open unfolded position.

4. The combination comprising an animal identification ear tag applicator comprising an elongated member having a pointed end substantially C-shaped for forming a slit in an ear of an animal to which an ear tag is to be applied, said member having a hollow interior at said pointed end and a closed slot along the longitudinal axis of said member near said pointed end; and a resilient one piece animal identification ear tag comprising an indicia bearing panel, an angled neck portion attached to one end of said panel and defining an acute angle therebetween, and at least three wings each extending in a different plane normal to the longitudinal axis of said neck portion, said wings being connected together along a line extending along the longitudinal axis of said angled neck portion, said wings being characterized by flexibly and resiliently folding together along said connecting line in substantially the same plane so that said wings are juxtaposable in parallel in the closed slot of the elongated member;

said slot being substantially near said pointed end of said applicator so that when the front of the ear of the animal is slit by the pointed end of the member said wings retained within said slot of the applicator is carried substantially through the slit whereupon the connecting line of said wings is adapted to abut said ear slit to eject the wings from the closed slot, thereby allowing the resilient wings to assume an open unfolded position.

* * * * *